US007611106B2

(12) United States Patent
Kondo et al.

(10) Patent No.: US 7,611,106 B2
(45) Date of Patent: Nov. 3, 2009

(54) ATTACHING STRUCTURE OF SUPPORTING LEGS FOR APPARATUS

(75) Inventors: Kazuyoshi Kondo, Osaka (JP); Nobuhiko Kita, Osaka (JP); Sei Onuma, Osaka (JP); Ryoh Idehara, Hyogo (JP); Yuusuke Furuichi, Osaka (JP); Genta Hagiwara, Osaka (JP); Kaoru Tada, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/314,061

(22) Filed: Dec. 3, 2008

(65) Prior Publication Data

US 2009/0152435 A1 Jun. 18, 2009

(30) Foreign Application Priority Data

Dec. 12, 2007 (JP) ............................ 2007-321387

(51) Int. Cl.
*F16M 11/02* (2006.01)

(52) U.S. Cl. ...................................... 248/188; 353/119

(58) Field of Classification Search ................. 248/188, 248/188.1, 188.2, 677; 399/107; 347/108, 347/222; 353/119, 70
See application file for complete search history.

(56) References Cited

U.S. PATENT DOCUMENTS

| | | | | |
|---|---|---|---|---|
| 6,785,502 | B2 | 8/2004 | Kondoh | |
| 6,793,348 | B2 * | 9/2004 | Lee et al. | 353/119 |
| 7,503,531 | B2 * | 3/2009 | Lee | 248/188.2 |
| 7,533,857 | B2 * | 5/2009 | Chung et al. | 248/188.2 |
| 2003/0031483 | A1 | 2/2003 | Kondoh | |
| 2007/0110473 | A1 | 5/2007 | Kondo et al. | |
| 2007/0110475 | A1 | 5/2007 | Idehara et al. | |
| 2007/0166073 | A1 | 7/2007 | Idehara et al. | |
| 2007/0205351 | A1 * | 9/2007 | Chien et al. | 248/677 |

(Continued)

FOREIGN PATENT DOCUMENTS

JP 60-65050 5/1985

(Continued)

OTHER PUBLICATIONS

English language abstract of 64-026336 dated Jan. 27, 1989.

(Continued)

*Primary Examiner*—Ramon O Ramirez
(74) *Attorney, Agent, or Firm*—Harness, Dickey & Pierce, P.L.C.

(57) ABSTRACT

An attaching structure of supporting legs for an apparatus is disclosed. The attaching structure of the supporting legs for the apparatus includes plural supporting leg attaching sections on a bottom section of a main body of the apparatus, and plural supporting legs each of which is attached to one of the supporting leg attaching sections in which the number of the supporting leg attaching sections is greater than the number of the supporting legs. Each of the supporting legs includes an elastic member which contacts an apparatus setting up surface and an elastic member holding section having a concave section inside which the elastic member is engaged. An exposure distance of the elastic member from the elastic member holding section in the height direction of the apparatus is less than a distance between the bottom section of the main body of the apparatus and the apparatus setting up surface in the height direction.

9 Claims, 13 Drawing Sheets

U.S. PATENT DOCUMENTS

| | | | |
|---|---|---|---|
| 2007/0246638 | A1 | 10/2007 | Idehara et al. |
| 2008/0007935 | A1 | 1/2008 | Kondo et al. |
| 2008/0050146 | A1 | 2/2008 | Kita et al. |
| 2008/0063425 | A1 | 3/2008 | Idehara et al. |
| 2008/0075502 | A1 | 3/2008 | Tada et al. |
| 2008/0253796 | A1 | 10/2008 | Idehara et al. |
| 2008/0279585 | A1 | 11/2008 | Furuichi et al. |
| 2008/0292356 | A1 | 11/2008 | Furuichi et al. |

FOREIGN PATENT DOCUMENTS

| | | |
|---|---|---|
| JP | 04-40198 | 7/1992 |
| JP | 3743146 | 6/1999 |
| JP | 2001-022142 | 1/2001 |
| JP | 2001-051462 | 2/2001 |
| JP | 2002-287452 | 10/2002 |
| JP | 2005-077498 | 3/2005 |
| JP | 2006-170391 | 6/2006 |
| JP | 2007-293251 | 11/2007 |

OTHER PUBLICATIONS

English language abstract of 11-164986 dated Jun. 22, 1999.

* cited by examiner

ATTACHING STRUCTURE OF SUPPORTING LEGS FOR APPARATUS

BACKGROUND OF THE INVENTION

1. Field of the Invention

The present invention generally relates to an attaching structure of supporting legs for an apparatus, for example, an image forming apparatus.

2. Description of the Related Art

Conventionally, as an attaching structure of supporting legs for an apparatus, a structure has been used in which supporting legs are suitably arranged on an apparatus setting up surface so that a main body of the apparatus is stably positioned (for example, see Patent Documents 1 through 5). That is, plural supporting legs are attached to the bottom surface of the main body of the apparatus. In particular, in an attaching structure of supporting legs for an apparatus in Patent Document 6, the supporting legs are positioned by considering the gravity center of the apparatus. In addition, in Patent Document 6, the number of supporting leg attaching sections on the apparatus is greater than the number of the supporting legs, and the supporting leg attaching position of at lest one of the supporting legs can be changed.

However, in the attaching structure of the supporting legs for the apparatus of Patent Document 6, a supporting leg attaching section to which a supporting leg is not attached protrudes from the bottom surface of the main body of the apparatus. When the protrusion length is great, the supporting leg attaching section may contact the apparatus setting up surface having an uneven surface. When the supporting leg attaching section contacts the uneven surface, even if the supporting legs are attached to corresponding suitable positions, the main body of the apparatus cannot be stably positioned.

In order to solve the above problem, a structure has been used in which a space having a predetermined distance or more is provided between the apparatus setting up surface and the bottom surface of the apparatus (for example, see Patent Documents 7 through 9).

[Patent Document 1] Japanese Patent Publication to Laid-Open to Public for Opposition No. H4-40198

[Patent Document 2] Japanese Laid-Open Patent Publication No. 2001-22142

[Patent Document 3] Japanese Laid-Open Patent Publication No. 2001-51462

[Patent Document 4] Japanese Laid-Open Patent Publication No. 2002-287452

[Patent Document 5] Japanese Laid-Open Patent Publication No. 2005-077498

[Patent Document 6] Japanese Laid-Open Patent Publication No. 2007-293251

[Patent Document 7] Japanese Laid-Open Utility Model Publication No. S60-065050

[Patent Document 8] Japanese Laid-Open Patent Publication No. 2006-170391

[Patent Document 9] Japanese Patent No. 3743146

However, in the conventional attaching structure of the supporting legs for the apparatus, in order to surely provide a space having a predetermined size or more between the apparatus setting up surface and the bottom surface of the main body of the apparatus, for example, a supporting leg attaching section protrudes inside the main body of the apparatus, and the exposure distance of the supporting leg attaching section from the bottom surface of the main body of the apparatus in the apparatus setting up surface direction is shortened. However, in this case, the attaching structure of the supporting legs for the apparatus becomes complex, and in addition, the apparatus must be designed so that interference between the supporting leg attaching section including the supporting legs and components in the main body of the apparatus is avoided. In order to avoid the interference, a space is required in the main body of the apparatus. Consequently, there is a risk that the size of the main body of the apparatus becomes great.

SUMMARY OF THE INVENTION

In a preferred embodiment of the present invention, there is provided an attaching structure of supporting legs for an apparatus in which the structure is simple and does not have a space for avoiding interference between supporting leg attaching sections including the supporting legs and components in the main body of the apparatus.

Features and advantages of the present invention are set forth in the description that follows, and in part will become apparent from the description and the accompanying drawings, or may be learned by practice of the invention according to the teachings provided in the description. Features and advantages of the present invention will be realized and attained by an attaching structure of supporting legs for an apparatus particularly pointed out in the specification in such full, clear, concise, and exact terms so as to enable a person having ordinary skill in the art to practice the invention.

To achieve one or more of these and other advantages, according to one aspect of the present invention, there is provided an attaching structure of supporting legs for an apparatus. The attaching structure of the supporting legs for the apparatus includes plural supporting leg attaching sections on a bottom section of the main body of the apparatus, and plural supporting legs each of which is attached to one of the supporting leg attaching sections in which the number of the supporting leg attaching sections is greater than the number of the supporting legs. Each of the supporting legs includes an elastic member which contacts an apparatus setting up surface and an elastic member holding section having a concave section inside which the elastic member is engaged. An exposure distance of the elastic member from the elastic member holding section in the height direction of the apparatus is less than a distance between the bottom section of the main body of the apparatus and the apparatus setting up surface in the height direction.

EFFECT OF THE INVENTION

According to an embodiment of the present invention, since a supporting leg attaching section and a supporting leg to be attached to the supporting leg attaching section are formed on a bottom section of the main body of an apparatus, and the supporting leg is formed of an elastic member and an elastic member holding section; an attaching structure of supporting legs for an apparatus can be simple and does not needs to have a space for avoiding interference between the supporting leg attaching sections including the supporting legs and components in the main body of the apparatus.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Best Mode of Carrying Out the Invention

The best mode of carrying out the present invention is described with reference to the accompanying drawings.

In the embodiment of the present invention, as an apparatus, an image forming apparatus is used. However, the apparatus is not limited to the image forming apparatus.

Figure 1:
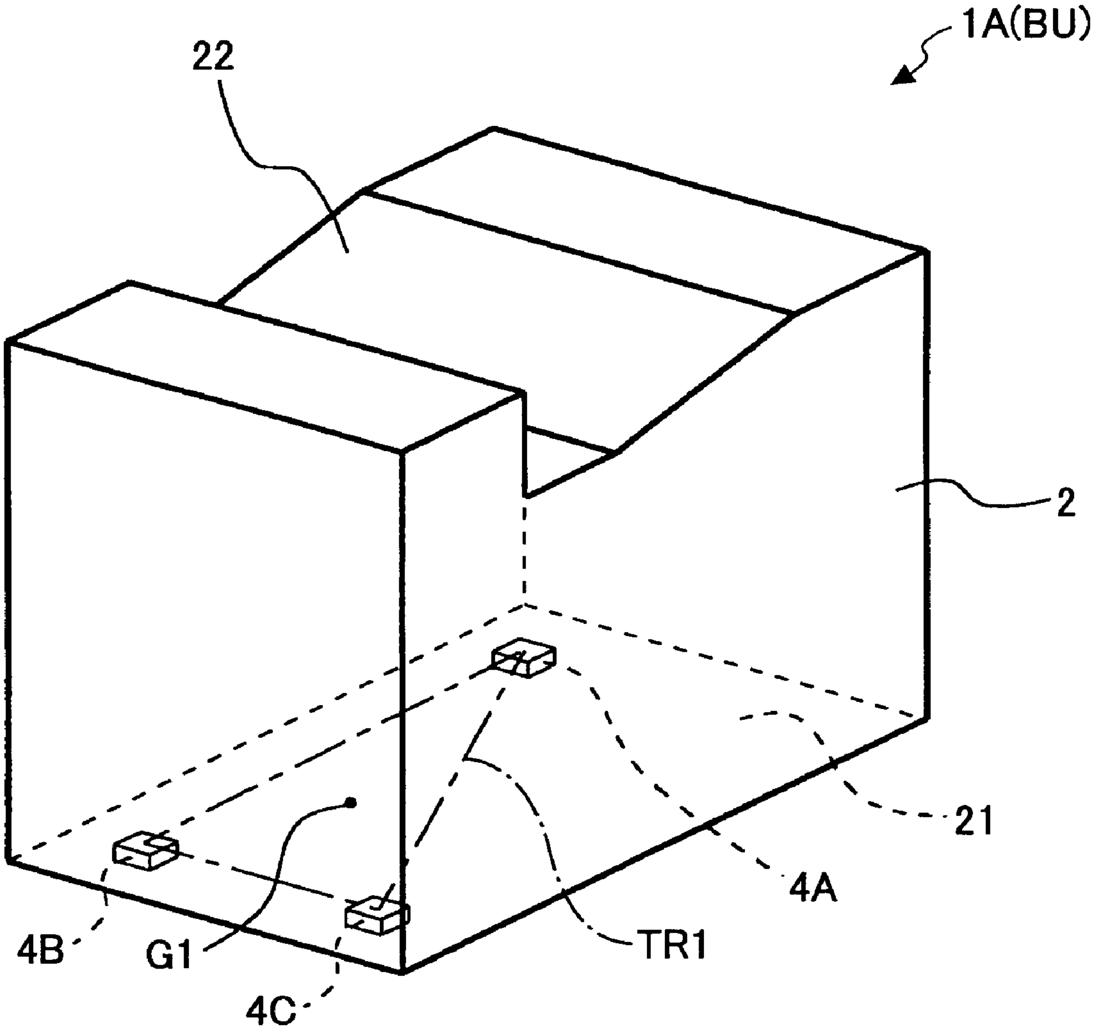
FIG. 1 is a perspective view of an image forming apparatus having an attaching structure of supporting legs for the apparatus according to an embodiment of the present invention.
Figure 2:
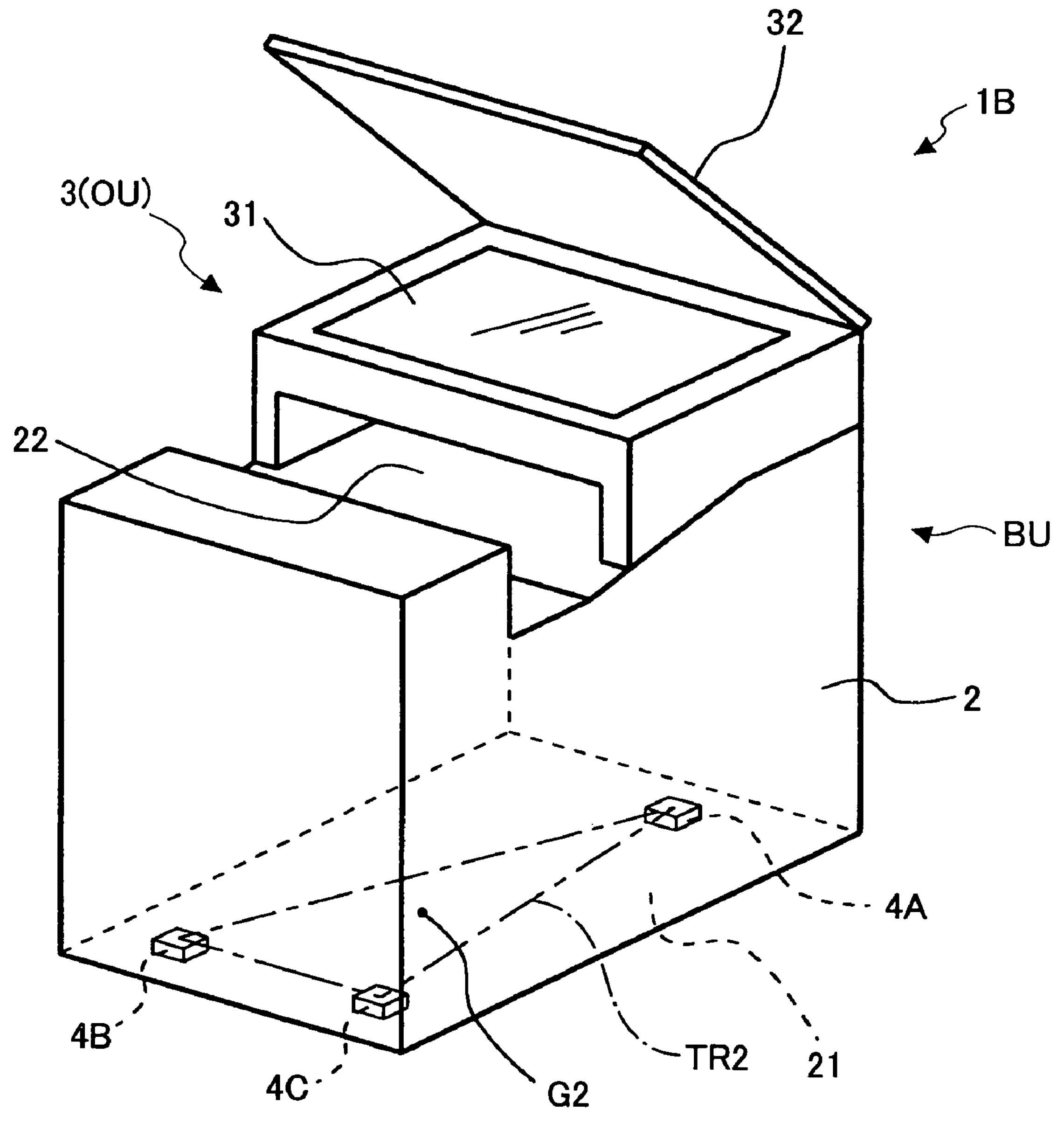
FIG. 2 is a perspective view of an image forming apparatus in which an optional unit is installed in a basic unit shown in FIG. 1.

FIG. 1 is a perspective view of an image forming apparatus 1A (basic unit BU) having an attaching structure of supporting legs for the apparatus 1A according to the embodiment of the present invention. FIG. 2 is a perspective view of an image forming apparatus 1B in which an optional unit OU is installed in the basic unit BU shown in FIG. 1. Each of the image forming apparatuses 1A and 1B includes an image forming unit in a cabinet 2 (main body of the image forming apparatus).

The basic unit BU can be used as a printer which outputs an image information signal transmitted from, for example, a computer connected to the basic unit BU.

The optional unit OU is an image scanner 3 which reads a document image.

As shown in FIG. 2, the image scanner 3 includes a contact glass 31 fixed at the upper part of the image scanner 3 and a plate 32 rotatably attached to the image scanner 3. When a document (not shown) is put on the contact glass 31 and the document is pushed by the plate 32, an image of the document is read by the image scanner 3. Therefore, the image forming apparatus 1B including the basic unit BU and the optional unit OU can be used as a copying machine or a facsimile machine.

In FIGS. 1 and 2, plural supporting legs 4A, 4B, and 4C are formed on the outside surface of a bottom section 21 of the cabinet 2. Since the supporting legs 4A, 4B, and 4C contact an apparatus setting up surface, for example, the floor of an office, the basic unit BU is separated from the apparatus setting up surface. In the image forming apparatus 1A, the supporting legs 4A, 4B, and 4C are positioned so that the gravity center G1, through which the force of gravity acts, of the image forming apparatus 1A is inside a triangle TR1 formed by straight lines connecting the supporting legs 4A, 4B, and 4C in the horizontal surface. In the image forming apparatus 1B, the supporting legs 4A, 4B, and 4C are positioned so that the gravity center G2 of the image forming apparatus 1B is inside a triangle TR2 formed by straight lines connecting the supporting legs 4A, 4B, and 4C in the horizontal surface. When the gravity center G1 is near the center of the triangle TR1, the image forming apparatus 1A can be stably positioned, and when the gravity center G2 is near the center of the triangle TR2, the image forming apparatus 1B can be stably positioned.

As described above, when the image forming apparatus 1A (1B) is supported by three points of the supporting legs 4A, 4B, and 4C, even if the apparatus setting up surface is slightly uneven, the image forming apparatus 1A (1B) can be stably set up on the apparatus setting up surface by positioning the supporting legs 4A, 4B, and 4C to avoid the slightly uneven surface. In addition, in this case, deformation or contortion may not occur in the image forming apparatus 1A (1B).

When the deformation or the contortion occurs in the image forming apparatus 1A (1B), a color registration error occurs in a formed full color image and the image quality of the formed full color image is lowered. In this case, even in a monochrome image, the image quality is lowered.

The optional unit 3 shown in FIG. 2 is installed at a position largely away from the center of the basic unit BU so that a recording medium (not shown) to be output on a sheet (paper) outputting section 22 of the basic unit BU is not difficult to output. Generally, the weight of the optional unit OU is greater than the weight assumed from the appearance of the optional unit OU. Therefore, the position of the gravity center G1 shown in FIG. 1 is largely different from the position of the gravity center G2 shown in FIG. 2. Generally, the weight ratio of the optional unit OU to the basic unit BU is approximately 1:4 to 1:3. Therefore, the gravity centers are largely different between the image forming apparatus having the optional unit OU and the image forming apparatus not having the optional unit OU.

Figure 3:
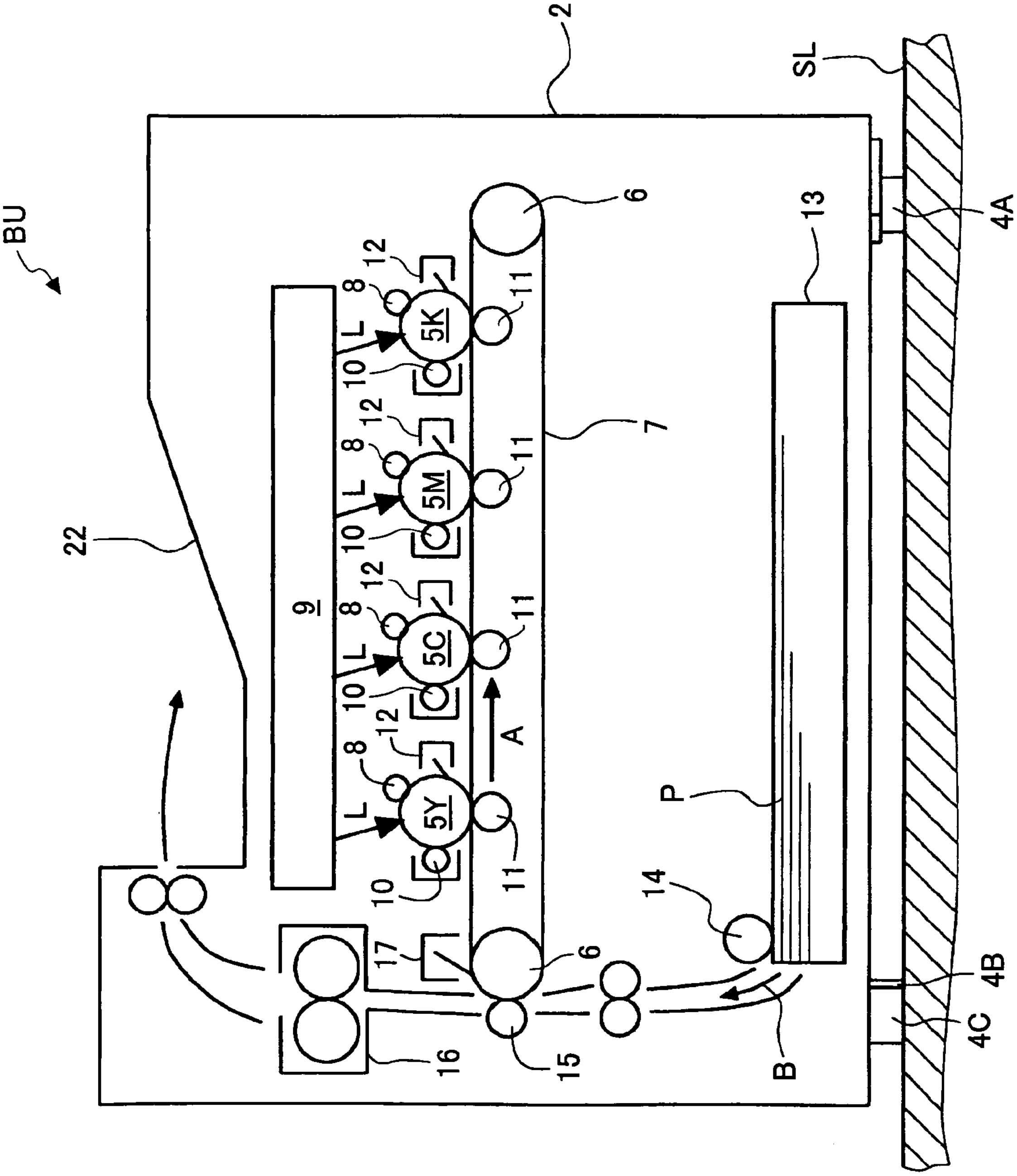
FIG. 3 is a cut-away side view of the basic unit shown in FIG. 1.

FIG. 3 is a cut-away side view of the basic unit BU shown in FIG. 1. As shown in FIG. 3, photoconductor bodies 5Y, 5C, 5M, and 5K are disposed in the cabinet 2 of the basic unit BU set up on an apparatus setting up surface SL. An endless intermediate transfer belt 7 is wound around two supporting rollers 6 at a position right under the photoconductor bodies 5Y, 5C, 5M, and 5K. The photoconductor bodies 5Y, 5C, 5M, and 5K are rotated counterclockwise, and the intermediate transfer belt 7 is moved in the arrow direction A. Each of the photoconductor bodies 5Y, 5C, 5M, and 5K is charged to have a predetermined polarity by the corresponding charging roller 8, and laser beams L modulated and emitted from an optical writing unit 9 are irradiated onto the corresponding charged surfaces of the photoconductor bodies 5Y, 5C, 5M, and 5K. With this, an electrostatic latent image is formed on each of the photoconductor bodies 5Y, 5C, 5M, and 5K. Each of the electrostatic latent images is visualized to be a toner image by being developed by a corresponding developing unit 10. Each of the toner images is transferred onto the intermediate transfer belt 7 which moves in the arrow direction A by rotation of a corresponding first transfer roller 11. After transferring the toner images onto the intermediate transfer belt 7 from the corresponding photoconductor bodies 5Y, 5C, 5M, and 5K, toners remaining on the photoconductor bodies 5Y, 5C, 5M, and 5K are removed by corresponding first cleaning devices 12.

In the above, a yellow toner image on the photoconductor body 5Y, a cyan toner image on the photoconductor body 5Y, a magenta toner image on the photoconductor body 5M, a black toner image on the photoconductor body 5K are sequentially transferred onto the intermediate transfer belt 7, and a color toner image is formed on the intermediate transfer belt 7.

A paper feeding cassette 13 which stores recording media P made of, for example, transfer paper or a resin sheet, and a paper feeding roller 14, which contacts one of the recording media P at the uppermost position stored in the paper feeding cassette 13, are disposed under the intermediate transfer belt 7.

When the paper feeding roller 14 is rotated, the recording medium P at the uppermost position is fed in the arrow direction B, and the fed recording medium P is passes through a nipping section between the intermediate transfer belt 7 and a second transfer roller 15 facing the intermediate transfer belt 7. When the recording medium P passes through the nipping section, the color toner image on the intermediate transfer belt 7 is transferred onto the recording medium P.

Next, the recording medium P passes through a fixing device 16. When the recording medium P passes through the fixing device 16, the color toner image on the recording medium P is fixed on the recording medium P by heat and pressure of the fixing device 16. The recording medium P on which the color toner image is formed is output to the paper outputting section 22 positioned at the upper part of the cabinet 2. In the above, after transferring the color toner image onto the recording medium P from the intermediate transfer belt 7, toners remaining on the intermediate transfer belt 7 are removed by a second cleaning device 17.

As described above, the positions of the gravity centers G1 and G2 of the corresponding image forming apparatuses 1A and 1B are different depending on whether the optional unit OU is installed. Therefore, when the three supporting legs 4A, 4B, and 4C are always attached to corresponding fixed positions of the bottom section 21 of the basic unit BU, the image forming apparatuses 1A and 1B may not be stable on the apparatus setting up surface SL.

Figure 4:
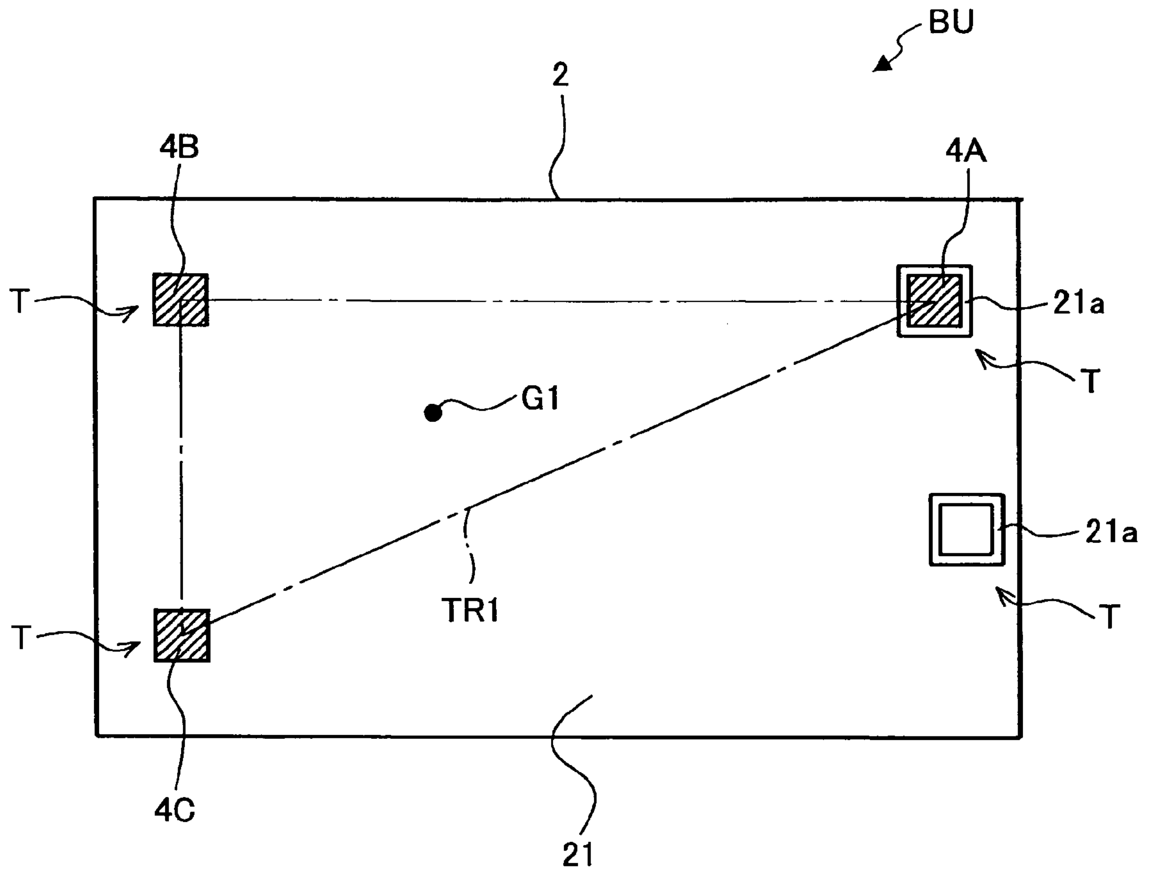
FIG. 4 is a first plan view of a bottom section of a cabinet of the basic unit shown in FIG. 1 in which three supporting legs and four supporting leg attaching sections are shown.
Figure 5:
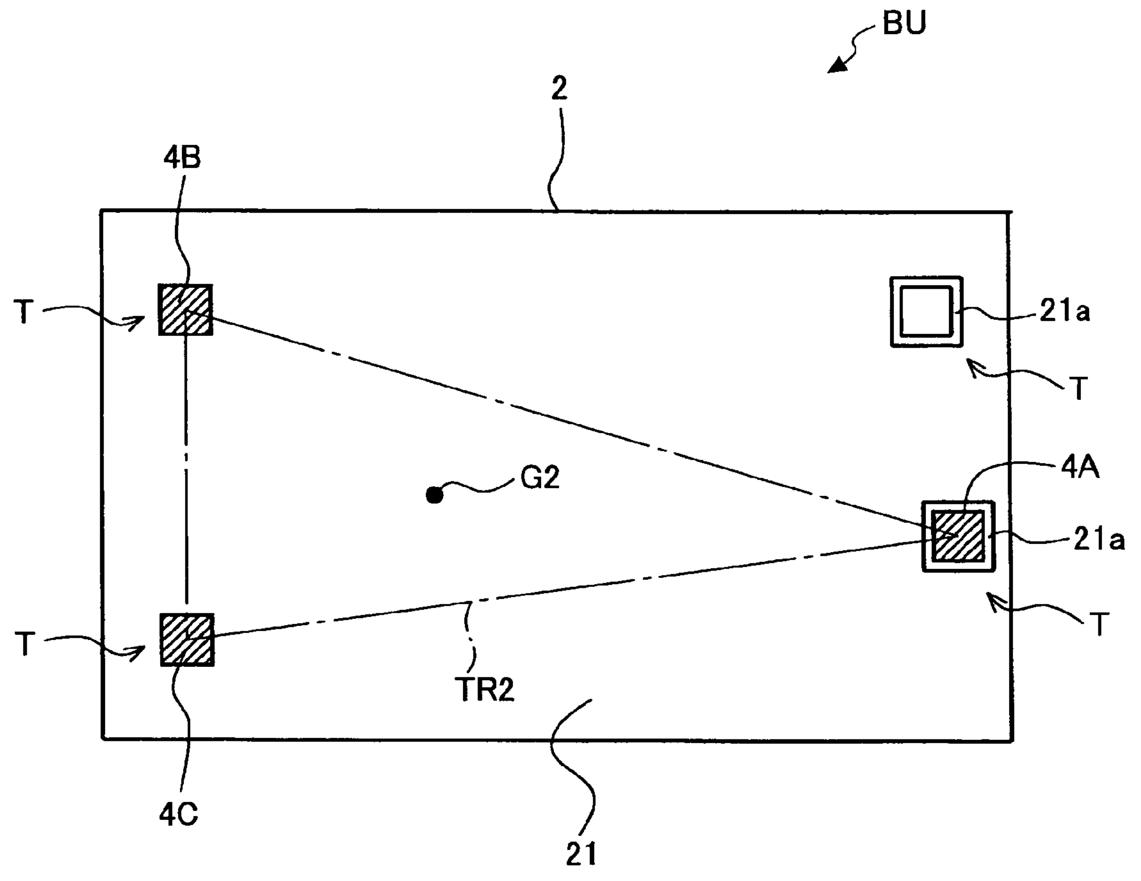
FIG. 5 is a second plan view of the bottom section of the cabinet of the basic unit shown in FIG. 1 in which the three supporting legs and the four supporting leg attaching sections are shown.

According to the embodiment of the present invention, as shown in FIGS. 4 and 5, four supporting leg attaching sections T are formed on the bottom section 21 of the cabinet 2. That is, the number of the supporting leg attaching sections T is greater than the number of the supporting legs 4A, 4B, and 4C. FIG. 4 is a first plan view of the bottom section 21 of the cabinet 2 in which the supporting legs 4A, 4B, and 4C, and the four supporting leg attaching sections T are shown. FIG. 5 is a second plan view of the bottom section 21 of the cabinet 2 of the basic unit BU in which the supporting legs 4A, 4B, and 4C, and the four supporting leg attaching sections T are shown.

As shown in FIGS. 4 and 5, the supporting leg attaching section T to which the supporting leg 4A is to be attached has a protruding section 21*a* of a rectangular frame shape. The protruding section 21*a* can be formed by unifying it with the bottom section 21 or it can be attached to the bottom section 21. When the number of the supporting leg attaching sections T is greater than the number of the supporting legs 4A, 4B, and 4C; the position of the supporting leg 4A can be widely selected from the supporting leg attaching sections T.

Therefore, even if the positions of the gravity centers G1 and G2 are different between the image forming apparatuses 1A and 1B, when one of the supporting leg attaching sections T is selected for the supporting leg 4A, each of the image forming apparatuses 1A and 1B can be stably set up on the apparatus setting up surface SL by considering the presence of the optional unit OU.

In FIGS. 4 and 5, the supporting leg 4A is engaged inside a concave section of the protruding section 21*a* of the supporting leg attaching section T, and is secured by using, for example, an adhesive. The protruding section 21*a* establishes the securing position of the supporting leg 4A, protects the adhering surface of the supporting leg 4A on the bottom section 21, and prevents the supporting leg 4A from falling or being removed from the adhering surface of the bottom section 21. In addition, the supporting leg 4A is formed by including an elastic material so that the image forming apparatus 1A (1B) is prevented from being vibrated or slid.

Figure 6:
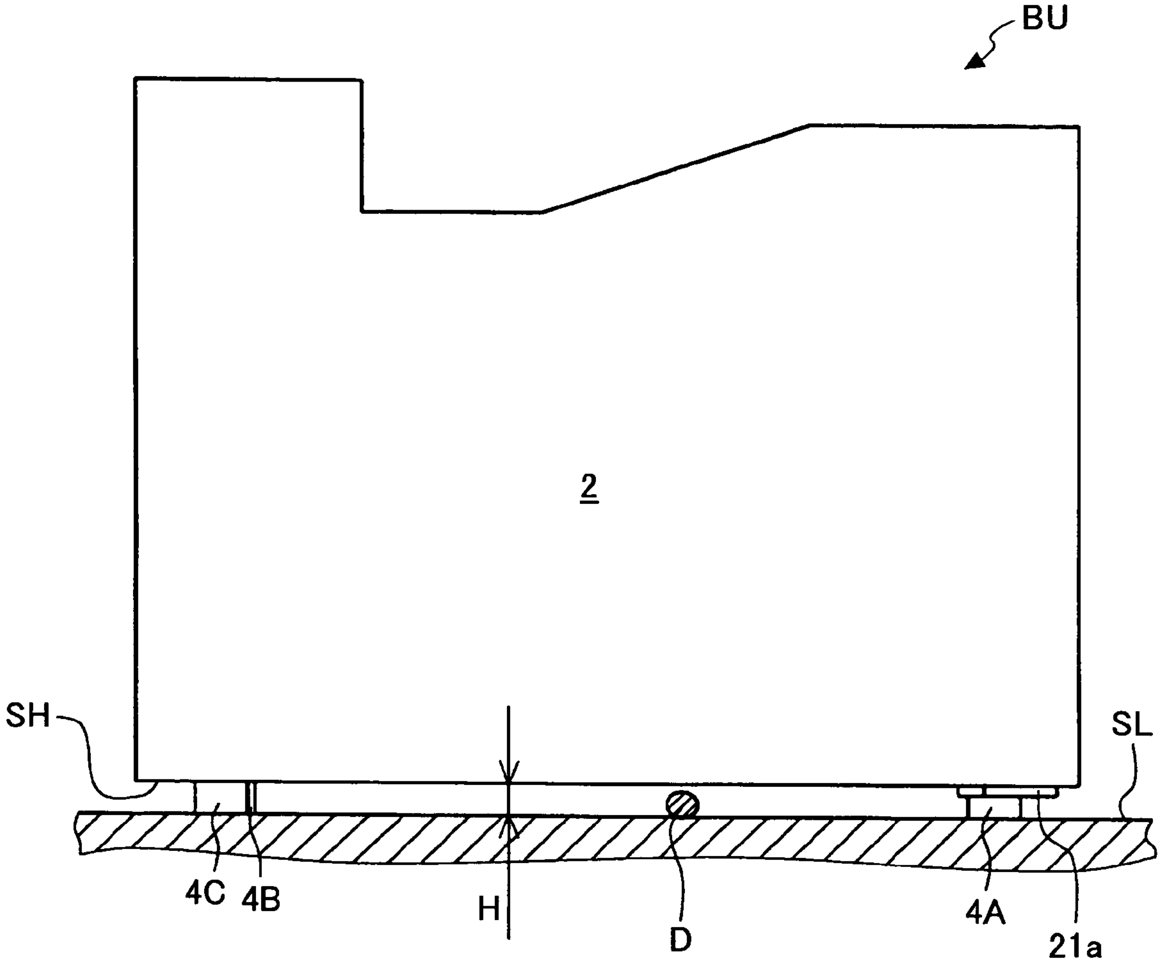
FIG. 6 is a side view of a situation in which foreign matter exists between an apparatus setting up surface and a bottom surface of the cabinet of the basic unit shown in FIG. 1.

FIG. 6 is a side view of a situation in which foreign matter D exists between the apparatus setting up surface SL and a bottom surface SH of the cabinet 2 of the basic unit BU shown in FIG. 1.

As shown in FIG. 6, even if the foreign matter D exists between the apparatus setting up surface SL and the bottom surface SH of the basic unit 20, a height H greater than the height of the foreign matter D is formed between the apparatus setting up surface SL and the bottom surface SH of the basic unit 20 so that the basic unit BU does not slant.

The height H is determined to be a value so that the foreign matter D does not contact the protruding section 21*a* in conditions where the supporting leg 4A does not engage inside the concave section of the protruding section 21*a*. When the height H is desired to be small, the height of the protruding section 21*a* is made to be small. However, the protruding section 21*a* prevents the supporting leg 4A from being removed from the bottom surface SH of the basic unit BU; therefore, the protruding section 21*a* needs to have a predetermined height. The removal of the supporting leg 4A from the bottom surface SH of the basic unit BU occurs when the basic unit BU is moved in the horizontal direction and hits on a step formed on the apparatus setting up surface SL.

Figure 7:
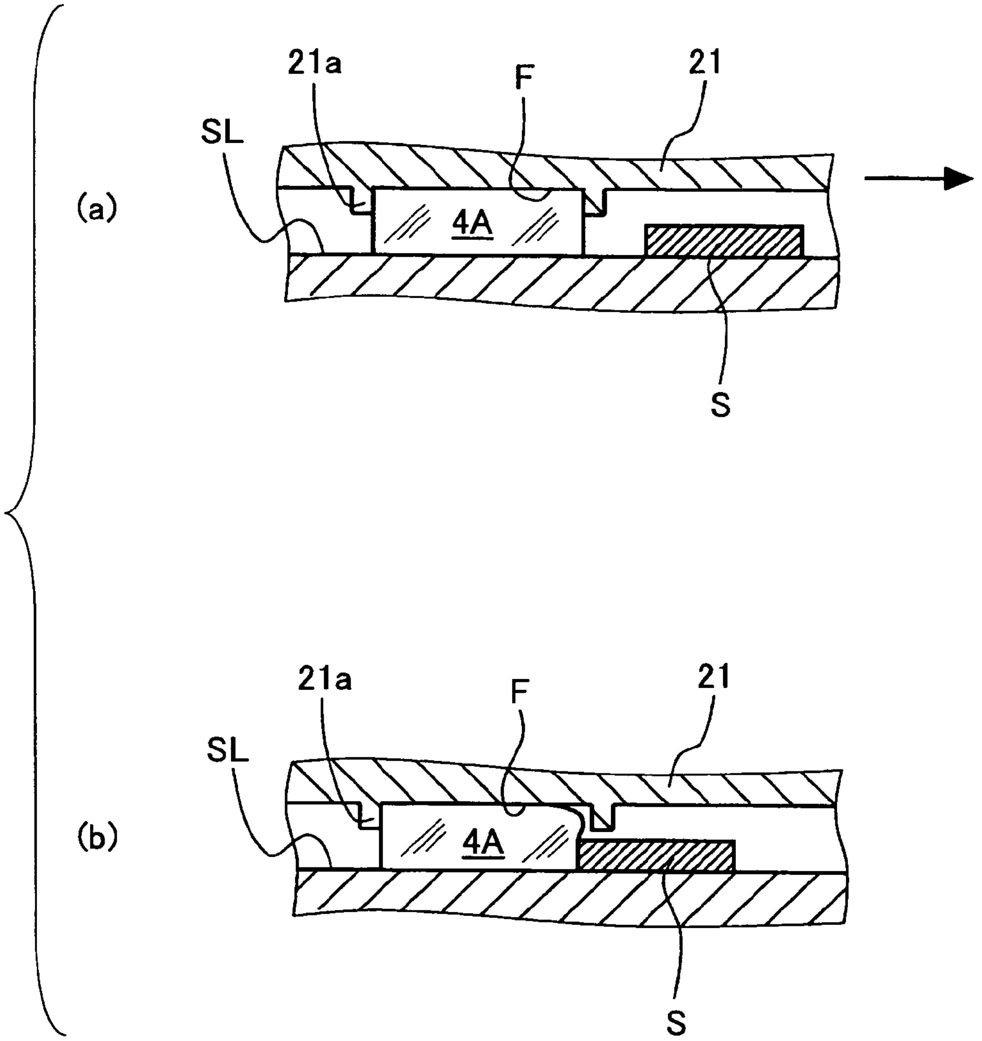
FIG. 7 is a cut-away side view of a part where the supporting leg contacts the apparatus setting up surface.

FIG. 7 is a cut-away side view of a part where the supporting leg 4A contacts the apparatus setting up surface SL. In FIG. 7, a supporting leg 4A is entirely formed of an elastic material and is different from the supporting leg 4A in the present embodiment. When the bottom section 21 is moved in the arrow direction shown in FIG. 7(*a*), the supporting leg 4A abuts on a step S as shown in FIG. 7(*b*), and the supporting leg 4A is deformed. When the abutted part of the supporting leg 4A on the step S is near an adhering surface F of the supporting leg 4A, the deformation of the supporting leg 4A influences the adhering surface F, and the supporting leg 4A is likely removed from the adhering layer F.

When the abutted part of the supporting leg 4A on the step S is away from the adhering surface F of the supporting leg 4A, the deformation of the supporting leg 4A hardly influences the adhering surface F, and the supporting leg 4A is hardly removed from the adhering layer F.

Therefore, in FIG. 7, in order that the supporting leg 4A is not removed from the bottom section 21 even if the abutted part of the supporting leg 4A on the step S is near the adhering surface F, the exposure distance of the supporting leg 4A from the protruding section 21*a* is preferably small. However, in a case where the exposure distance is small, when foreign matter exists, the apparatus is not stably positioned.

Figure 8:
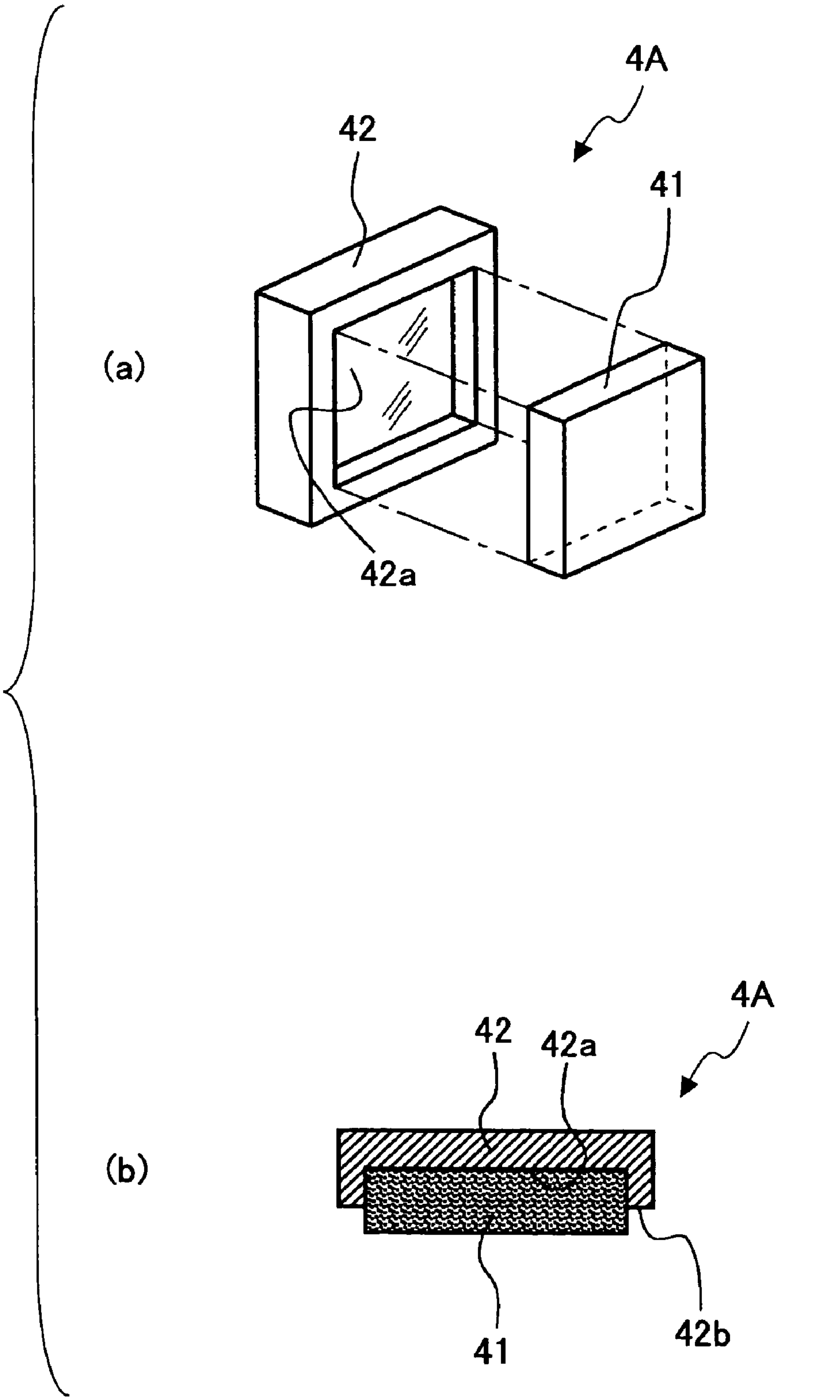
FIG. 8 is a diagram showing the supporting leg according to the embodiment of the present invention.

FIG. 8 is a diagram showing the supporting leg 4A according to the embodiment of the present invention. FIG. 8(*a*) shows an exploded perspective view of the supporting leg 4A, and FIG. 8(*b*) shows a cut-away side view of the supporting leg 4A.

As shown in FIG. 8(*a*), the supporting leg 4A is formed of an elastic member 41 which contacts the apparatus setting up surface SL (see FIG. 6) and an elastic member holding section 42. In FIG. 8(*a*), a part of the elastic member 41 is engaged inside a concave section 42*a* having a rectangular shape of the elastic member holding section 42. That is, when the supporting leg 4A is viewed from the side, as shown in FIG. 8(*b*), a part of the elastic member 41 is engaged inside the concave section 42*a*, and another part of the elastic member 41 protrudes from a surface 42*b* of the elastic member holding section 42. The elastic member holding section 42 is formed of a material harder than the material of the elastic member 41. That is, as the material of the elastic member holding section 42, a high rigidity material, for example, metal or resin is preferably used.

Figure 9:
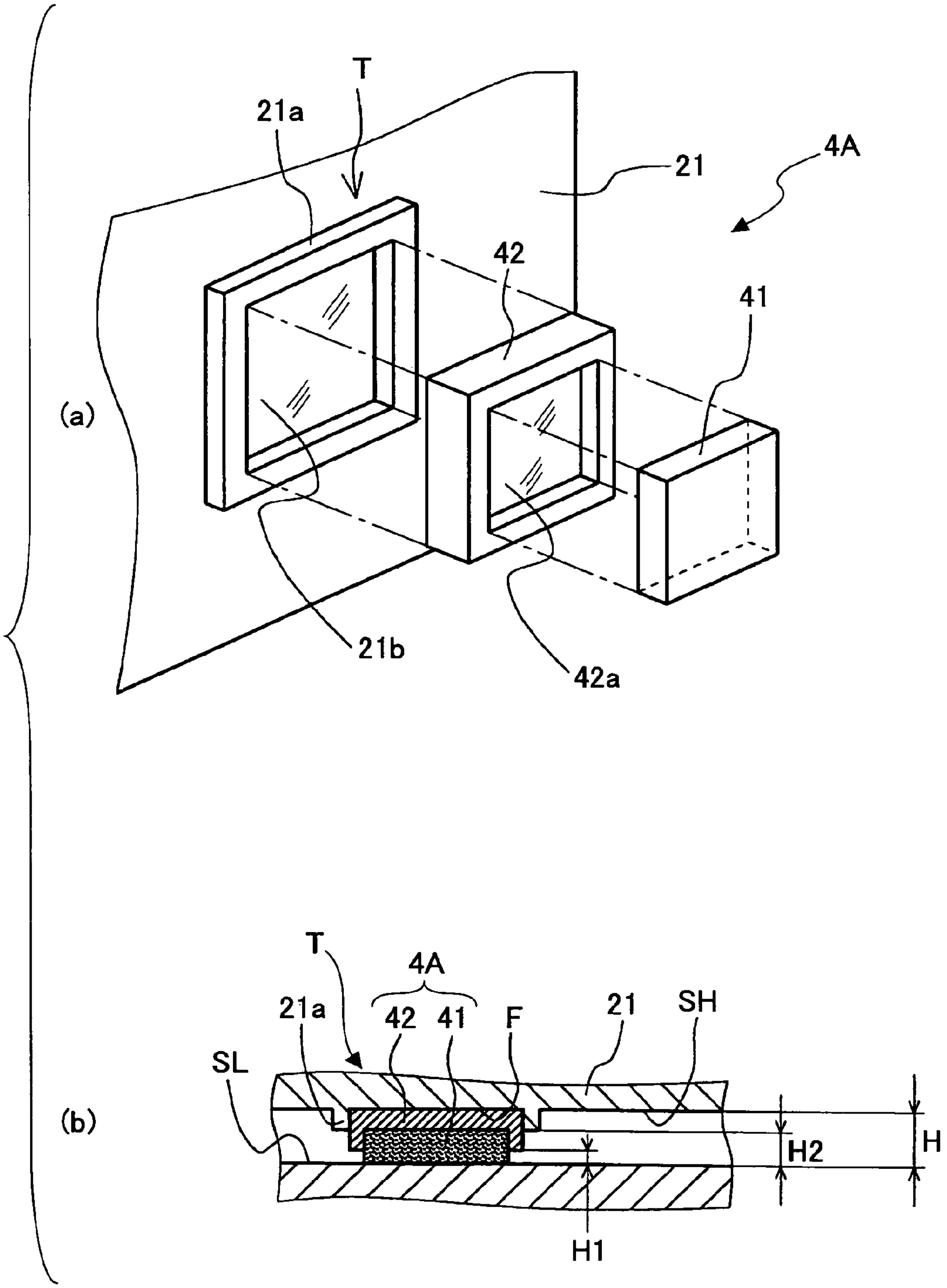
FIG. 9 is a diagram showing a structure of the supporting leg and the supporting leg attaching section.

FIG. 9 is a diagram showing a structure of the supporting leg 4A and the supporting leg attaching section T. In FIG. 9, (a) shows an exploded perspective view before attaching the supporting leg 4A to the supporting leg attaching section T, and (b) shows a cut-away side view after attaching the supporting leg 4A to the supporting leg attaching section T.

In FIG. 9(*a*), a part of the elastic member holding section 42 is engaged inside a concave section 21*b* of the bottom section 21. In addition, in FIG. 9(*a*), when a part of the elastic member 41 is engaged inside the concave section 42*a* of the elastic member holding section 42 and the supporting leg 4A is formed and a part of the supporting leg 4A is engaged inside the concave section 21*b*, as shown in FIG. 9(*b*), the supporting leg 4A is attached to the supporting leg attaching section T.

In FIG. 9(*b*), an exposure distance H1 of the elastic member 41 from the elastic member holding section 42 in the height direction is less than the height H between the apparatus setting up surface SL and the bottom surface SH. As shown in FIG. 9(*b*), a part of the elastic member 41 is exposed from the elastic member holding section 42 under the bottom surface SH; therefore, it is not necessary for the bottom section 21 to form a concave section for attaching the elastic member 41 in the bottom section 21. That is, the supporting leg 4A and the supporting leg attaching section T do not need to be formed inside the bottom section 21, and a space for the supporting leg 4A and the supporting leg attaching section T is not required inside the bottom section 21. Consequently, the structure is simple. In other words, a non-interference space is not required between the supporting leg attaching section T including the supporting legs 4A through 4C and components in the cabinet 2 of the image forming apparatus 1A (1B) (see FIGS. 1 and 2).

In FIG. 9(*b*), since the protruding section 21*a* exists, an exposure distance H2 of the supporting leg 4A in the height direction is less than the height H between the apparatus setting up surface SL and the bottom surface SH. In a case where the height of the step S (see FIG. 7) is greater than the exposure distance H1 of the elastic member 41 and is less than the exposure distance H2 of the supporting leg 4A, when the supporting leg 4A is moved toward the step S in the horizontal direction, the step S abuts on the elastic member holding section 42. However, since the elastic member holding section 42 is formed of a material having high rigidity, even if the step S abuts on the elastic member holding section 42 and an impact of the abutting is given to the elastic member holding section 42, the deformation of the elastic member holding section 42 is small and the elastic member holding section 42 is not removed from the adhering surface F.

When the height of the step S (see FIG. 7) is less than the exposure distance H1 of the supporting leg 4A and the supporting leg 4A is moved toward the step S in the horizontal direction, the step S abuts on the elastic member 41. However, since the elastic member 41 is formed of an elastic material, even if the step S abuts on the elastic member 41, an impact of the abutting is sufficiently small, and the elastic member 41 is not removed from the elastic member holding section 42.

According to the embodiment of the present invention, a part of the elastic member 41 compressed by being attached to the elastic member holding section 42 is exposed from the elastic member holding section 42. With this, the elastic member holding section 42 does not contact the apparatus setting up surface SL. If the elastic member holding section 42 contacts the apparatus setting up surface SL and the image forming apparatus 1A (1B) is dragged, a scratch may be formed on the apparatus setting up surface SL. However, since only the elastic member 41 contacts the apparatus setting up surface SL, anti-vibration ability and anti-slide ability of the image forming apparatus 1A (1B) can be obtained.

Figure 10:
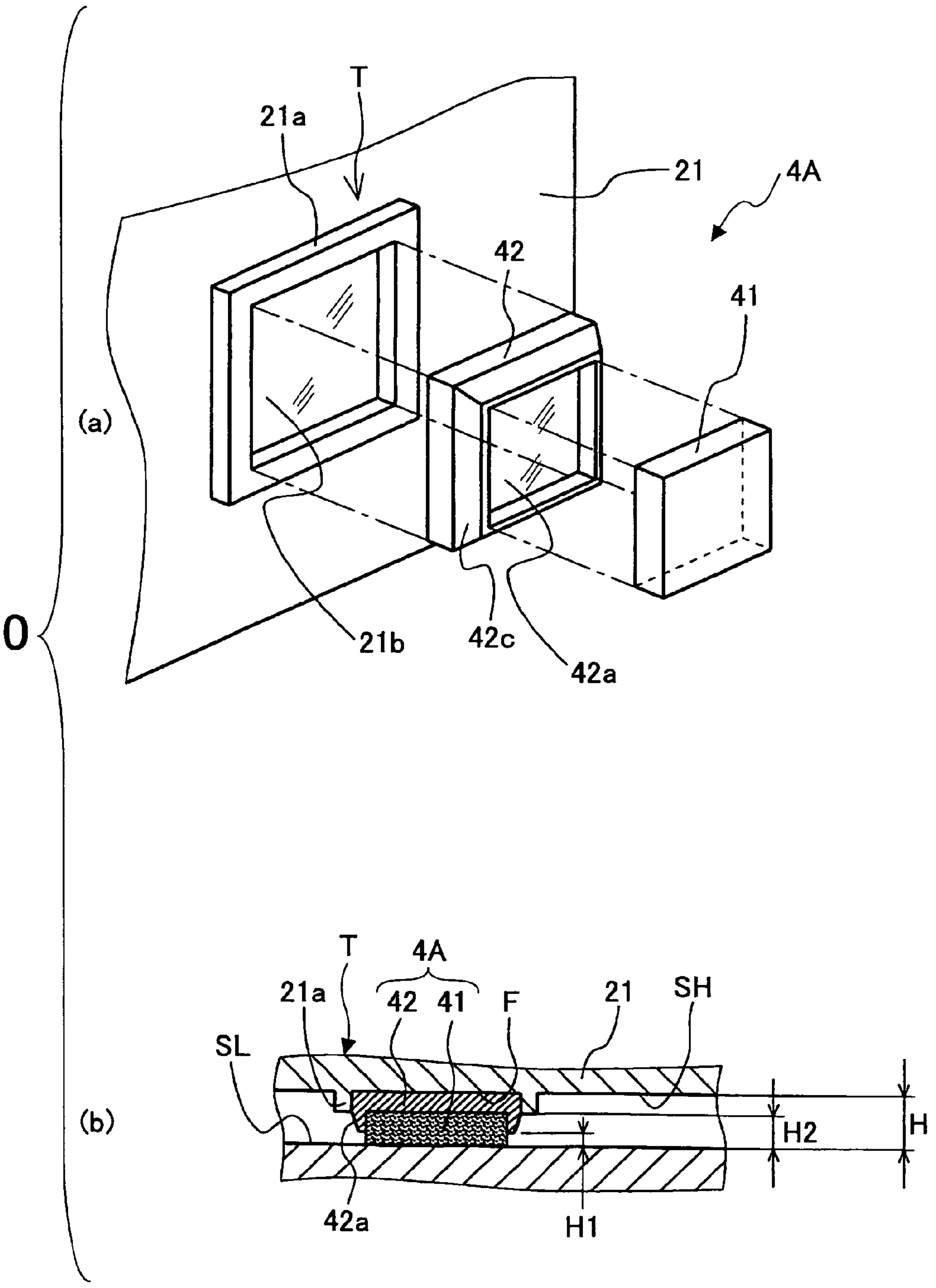
FIG. 10 is a diagram showing another structure of the supporting leg and the supporting leg attaching section.

FIG. 10 is a diagram showing another structure of the supporting leg 4A and the supporting leg attaching section T. In FIG. 10, (a) shows an exploded perspective view before attaching the supporting leg 4A to the supporting leg attaching section T, and (b) shows a cut-away side view after attaching the supporting leg 4A to the supporting leg attaching section T.

As shown in FIG. 10, the elastic member holding section 42 can provide a slant surface 42*c*. When the elastic member holding section 42 provides the slant surface 42*c* and the elastic member holding section 42 abuts on the step S (see FIG. 7), an impact given by the abutting can be dispersed, a force to deform the elastic member holding section 42 becomes small, and the supporting leg 4A is hardly removed from the adhering surface F. In addition, a force is generated in the vertical direction at the abutting part and the image forming apparatus 1A (1B) (see FIGS. 1 and 2) likely gets over the step S. The above attaching structure of the supporting legs for the apparatus can be effectively used for a relatively light-weight apparatus whose position is frequently changed in an office.

Figure 11:
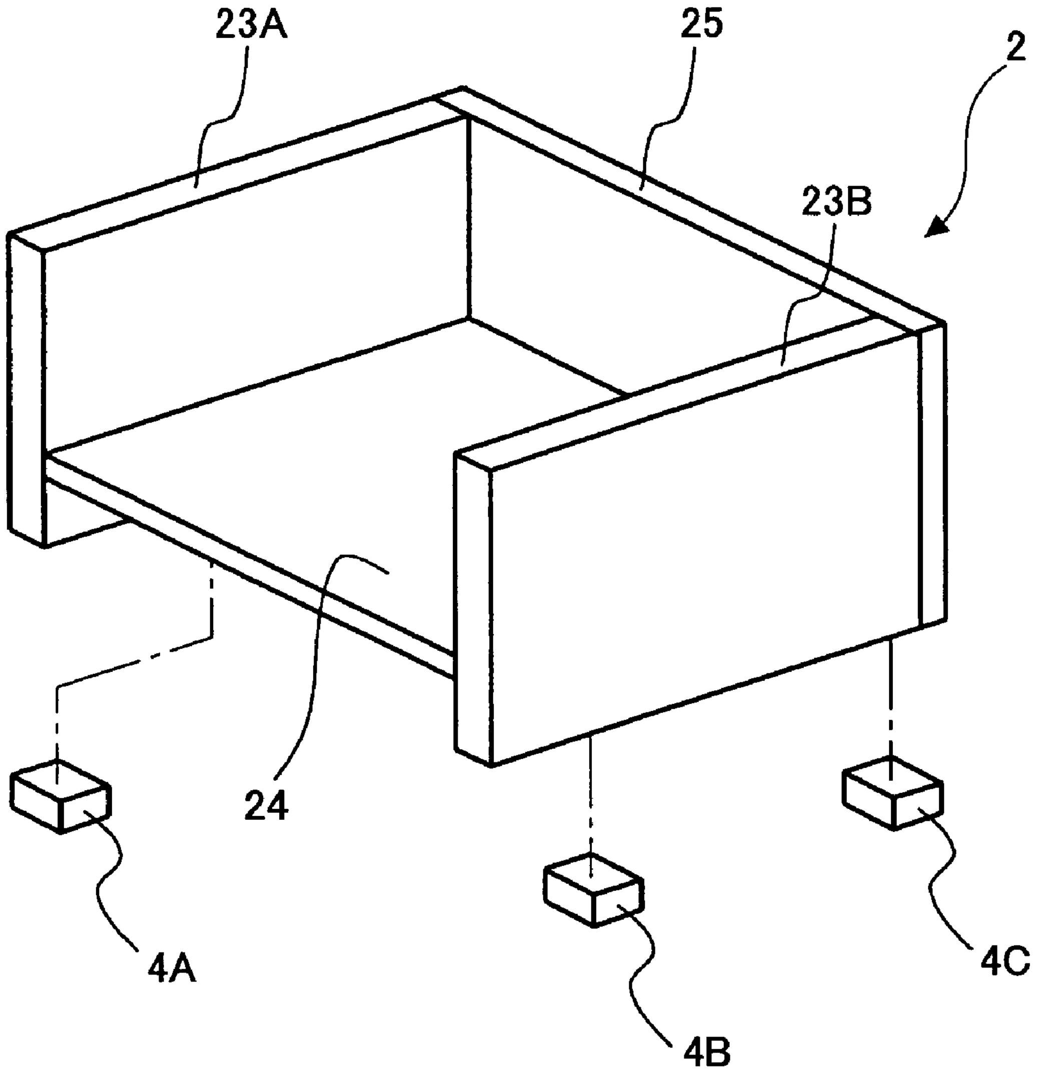
FIG. 11 is a perspective view of the cabinet of the apparatus.
Figure 12A:
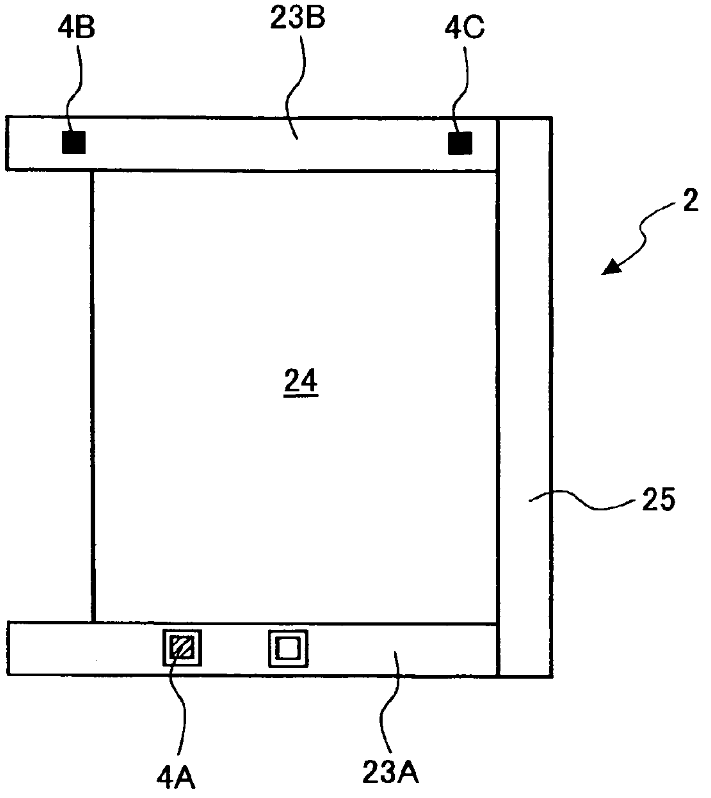
FIG. 12A is a plan view of the cabinet shown in FIG. 11.
Figure 12B:
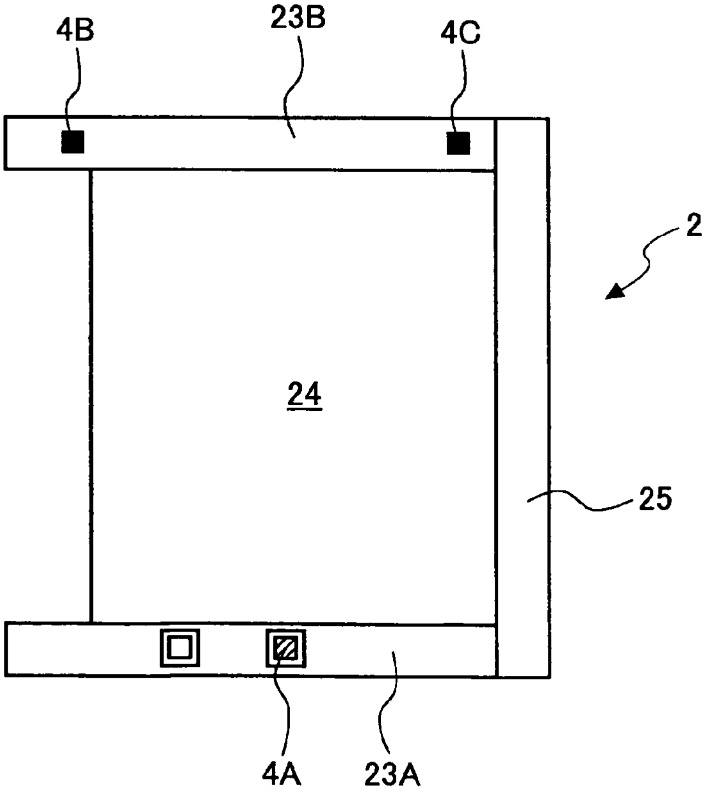
FIG. 12B is another plan view of the cabinet shown in FIG. 11.

Next, a modified example of the embodiment of the present invention is described. FIG. 11 is a perspective view of the cabinet 2 of the apparatus. FIG. 12A is a plan view of the cabinet 2 shown in FIG. 11 and FIG. 12B is another plan view of the cabinet 2 shown in FIG. 11. As shown in FIGS. 11, 12A and 12B, the cabinet 2 includes side plates 23A and 23B, a shelf plate 24, and a rear plate 25; and the supporting leg 4A is attached to a bottom surface of the side plate 23A and the supporting legs 4B and 4C are attached to a bottom surface of the side plate 23B. In the modified example shown in FIGS. 11, 12A, and 12B, the same effect as that in the embodiment of the present invention can be realized.

In the above, as the apparatus, the image forming apparatus is used; however, the attaching structure of the supporting legs for the apparatus of the present embodiment can be widely applied to other apparatuses.

Next, an evaluation result of the embodiment of the present invention is described. In the evaluation, un-removable ability of the supporting leg 4A from the adhering surface F of the bottom section 21 of the cabinet 2 was measured. In the evaluation, results of three examples are shown in Table 1.

In the three examples, the supporting leg 4A was adhered to the supporting leg attaching section T of the cabinet 2 of an image forming apparatus, the image forming apparatus was dragged on the apparatus setting up surface SL, and the image forming apparatus got over the step S. In addition, the weight of the image forming apparatus was approximately 30 kg, the hardness of the elastic member 41 was an Asker hardness of 72 to 88 degrees, the elastic member holding section 42 is formed of ABS (acrylonitrile butadiene styrene) resin, and the distance H2 between the bottom surface SH and the apparatus setting up surface SL was approximately 3 mm. Further, the image forming apparatus was gotten over the step S 20 times while the height of the step S was changed from 1.0 mm to 2.5 mm with an interval of 0.5 mm.

Embodiment Example 1

Figure 13:
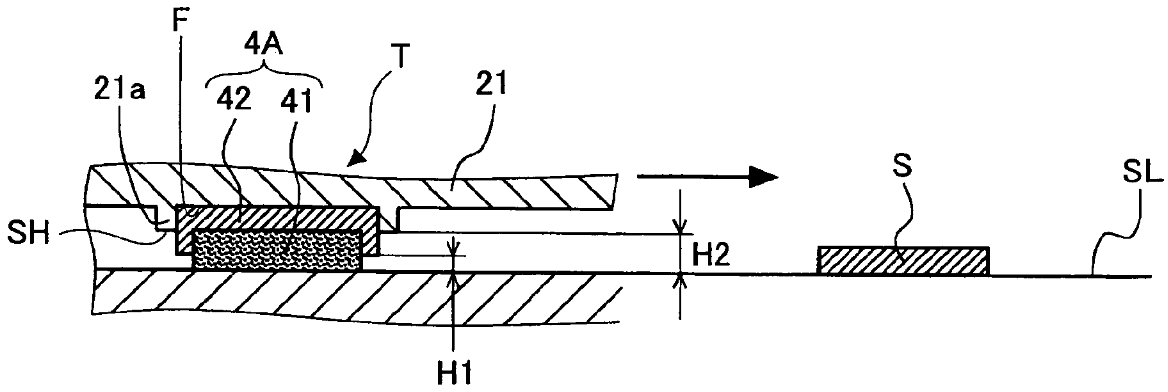
FIG. 13 is a cut-away side view of a structure after attaching the supporting leg to the supporting leg attaching section.

FIG. 13 is a cut-away side view of a structure after attaching the supporting leg 4A to the supporting leg attaching section T. In FIG. 13, the exposure distance H1 of the elastic member 41 from the elastic member holding section 42 was 1 mm.

Comparative Example 1

Figure 14:
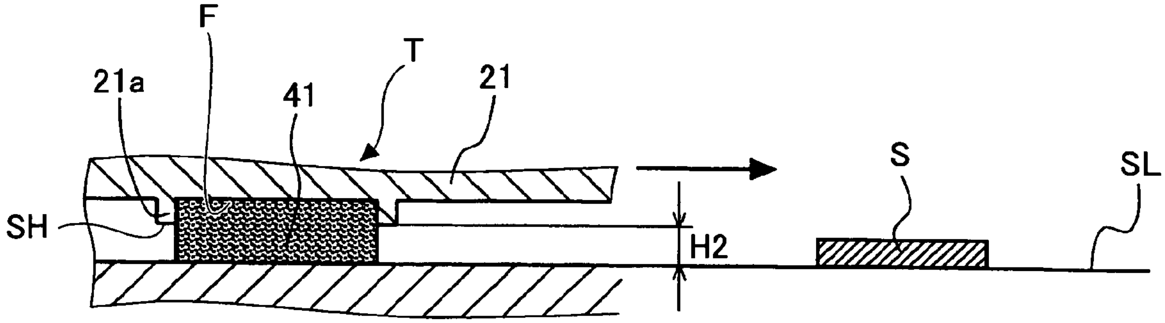
FIG. 14 is a cut-away side view of a structure in which an elastic member is directly attached to the supporting leg attaching section without using an elastic member holding section.

FIG. 14 is a cut-away side view of a structure in which the elastic member 41 is directly attached to the supporting leg attaching section T without using the elastic member holding section 42. In the comparative example 1, the structure shown in FIG. 14 was used.

Embodiment Example 2

In the embodiment example 2, the elastic member holding section 42 having the slant surface 42*c* shown in FIG. 10 was used.

TABLE 1

| | Height of Step S (mm) | | | |
|---|---|---|---|---|
| | 1.0 | 1.5 | 2.0 | 2.5 |
| Embodiment Example 1 (Elastic member holding section exists.) | ○ | ○ | ○ | ○ |
| Comparative Example 1 (Elastic member holding section does not exist.) | ○ | x | x | x |
| Embodiment Example 2 (Elastic member holding section exists.) | ○ | ○ | ○ | ○ |

○: The supporting leg 4A was not removed.
x: The supporting leg 4A was removed.

From the evaluation result shown in Table 1, when the elastic member holding section 42 was included, the supporting leg 4A was not removed from the adhering surface F of the bottom section 21 of the cabinet 2. In addition, even if the elastic member holding section 42 was not included, when the height of the step S was 1.0 mm, the supporting leg 4A was not removed from the adhering surface F. That is, when the exposure distance H1 of the elastic member 41 is small, the supporting leg 4A is hardly removed from the bottom surface SH of the bottom section 21.

In the above, the supporting leg 4A is mainly described; however, the supporting legs 4B and 4C can have the same structure as that of the supporting leg 4A. In addition, the number of the supporting legs is three and the number of the supporting leg attaching sections is four. However, the number of the supporting legs is not limited to three and can be four or more, and the number of the supporting leg attaching sections is not limited to four and can be five or more. That is, the number of the supporting leg attaching sections is greater than the number of the supporting legs.

Further, the present invention is not limited to the specifically disclosed embodiments, and variations and modifications may be made without departing from the scope of the present invention.

The present invention is based on Japanese Priority Patent Application No. 2007-321387, filed on Dec. 12, 2007, with the Japanese Patent Office, the entire contents of which are hereby incorporated herein by reference.

What is claimed is:

1. An attaching structure of supporting legs for an apparatus, comprising:

a plurality of supporting leg attaching sections on a bottom section of a main body of the apparatus; and a plurality of supporting legs each of which is attached to one of the supporting leg attaching sections in which the number of the supporting leg attaching sections is greater than the number of the supporting legs; wherein each of the supporting legs includes an elastic member which contacts an apparatus setting up surface and an elastic member holding section having a concave section inside which the elastic member is engaged; and an exposure distance of the elastic member from the elastic member holding section in the height direction of the apparatus is less than a distance between the bottom section of the main body of the apparatus and the apparatus setting up surface in the height direction.

2. The attaching structure of the supporting legs for the apparatus as claimed in claim 1, wherein:

the hardness of a material of the elastic member holding section is greater than the hardness of a material of the elastic member.

3. The attaching structure of the supporting legs for the apparatus as claimed in claim 1, wherein:

the elastic member holding section includes a slant surface on a surface surrounding the concave section.

4. An apparatus, comprising:

an attaching structure of supporting legs for the apparatus; wherein the attaching structure of the supporting legs for the apparatus includes a plurality of supporting leg attaching sections on a bottom section of a main body of the apparatus; and a plurality of supporting legs each of which is attached to one of the supporting leg attaching sections in which the number of the supporting leg attaching sections is greater than the number of the supporting legs; wherein each of the supporting legs includes an elastic member which contacts an apparatus setting up surface and an elastic member holding section having a concave section inside which the elastic member is engaged; and an exposure distance of the elastic member from the elastic member holding section in the height direction of the apparatus is less than a distance between the bottom section of the apparatus and the apparatus setting up surface in the height direction.

5. The apparatus as claimed in claim 4, wherein:

the hardness of a material of the elastic member holding section is greater than the hardness of a material of the elastic member.

6. The apparatus as claimed in claim 4, wherein:

the elastic member holding section includes a slant surface on a surface surrounding the concave section.

7. An image forming apparatus, comprising an attaching structure of supporting legs for the apparatus; wherein the attaching structure of the supporting legs for the apparatus includes a plurality of supporting leg attaching sections on a bottom section of a main body of the apparatus; and a plurality of supporting legs each of which is attached to one of the supporting leg attaching sections in which the number of the supporting leg attaching sections is greater than the number of the supporting legs; wherein each of the supporting legs includes an elastic member which contacts an apparatus setting up surface and an elastic member holding section having a concave section inside which the elastic member is engaged; and an exposure distance of the elastic member from the elastic member holding section in the height direction of the apparatus is less than a distance between the bottom section of the apparatus and the apparatus setting up surface in the height direction.

8. The image forming apparatus as claimed in claim 7, wherein:

the hardness of a material of the elastic member holding section is greater than the hardness of a material of the elastic member.

9. The image forming apparatus as claimed in claim 7, wherein:

the elastic member holding section includes a slant surface on a surface surrounding the concave section.

* * * * *